(12) United States Patent
Bryskin

(10) Patent No.: US 9,628,367 B2
(45) Date of Patent: Apr. 18, 2017

(54) METHOD FOR TRAFFIC ENGINEERING ON NETWORKS MADE OF ASYMMETRICAL NETWORK SWITCHES

(71) Applicant: ADVA Optical Networking SE, Meiningen (DE)

(72) Inventor: Igor Bryskin, Great Falls, VA (US)

(73) Assignee: ADVA Optical Networking SE, Meiningen (DE)

( * ) Notice: Subject to any disclaimer, the term of this patent is extended or adjusted under 35 U.S.C. 154(b) by 67 days.

(21) Appl. No.: 13/923,613

(22) Filed: Jun. 21, 2013

(65) Prior Publication Data

US 2014/0376404 A1   Dec. 25, 2014

(51) Int. Cl.
*H04L 12/751* (2013.01)
*H04J 14/02* (2006.01)

(52) U.S. Cl.
CPC .............. *H04L 45/02* (2013.01); *H04J 14/02* (2013.01)

(58) Field of Classification Search
CPC .............................. H04L 12/751; H04L 45/02
See application file for complete search history.

(56) References Cited

U.S. PATENT DOCUMENTS

| | | | |
|---|---|---|---|
| 2002/0006112 A1* | 1/2002 | Jaber ....................... | H04L 41/12 370/238 |
| 2005/0163101 A1* | 7/2005 | Ashwood Smith ... | H04L 49/602 370/351 |
| 2010/0142943 A1* | 6/2010 | Frankel .............. | H04B 10/0795 398/25 |
| 2011/0008052 A1* | 1/2011 | Lee .................... | H04Q 11/0062 398/79 |

(Continued)

FOREIGN PATENT DOCUMENTS

EP          2 464 045 A2    6/2012
WO    2011/147261 A2      12/2011

OTHER PUBLICATIONS

Zhang, Fatai et al., "OSPF-TE Extensions for General Network Element Constraints; draft-ietf-ccamp-gmpls-general-constraints-ospf-te-04.txt.", Internet Engineering Task Force, IETF, Standardworkingdraft, Internet Society (ISOC), Jul. 6, 2012, 14 pages.

(Continued)

*Primary Examiner* — Charles C Jiang
*Assistant Examiner* — Kyaw Z Soe
(74) *Attorney, Agent, or Firm* — Westman, Champlin & Koehler, P.A.

(57) ABSTRACT

An asymmetrical network switch adapted to auto-discover and advertise into a traffic engineering, TE, domain a switch detailed connectivity matrix, SDCM, containing for each allowed switching combination of interfaces of said asymmetrical network switch at least one switch detailed connectivity matrix entry, SDCME, wherein each said SDCME represents an internal to said asymmetrical network switch potential connection interconnecting the interfaces of said interface switching combination, wherein a SDCME advertisement includes a switch detailed connectivity matrix entry cost vector, SDCME CV, which comprises a set of attributes describing cost penalties in terms of various service characteristics that a network service incurs if it selects a path or a tree traversing the asymmetrical switch in accordance with the SDCME.

17 Claims, 1 Drawing Sheet

(56) References Cited

U.S. PATENT DOCUMENTS

2011/0080846 A1* 4/2011 He .................... H04L 12/462
370/254
2013/0308444 A1* 11/2013 Sem-Jacobsen ...... H04L 47/125
370/230

OTHER PUBLICATIONS

Bernstein, G. et al., "General Network Element Constraint Encoding for GMPLS Controlled; draft-ietf-ccamp-general-constraint-encode-11.txt", General Network Element Constraint Encoding for GMPLS Controlled, Internet Engineering Task Force, IETF; Standardworkingdraft, Internet Society (ISOC), May 6, 2013, 32 pages.
Extended European Search Report for European Patent Application No. 14155781.9-1853, dated Jan. 7, 2015, 12 pages.

* cited by examiner

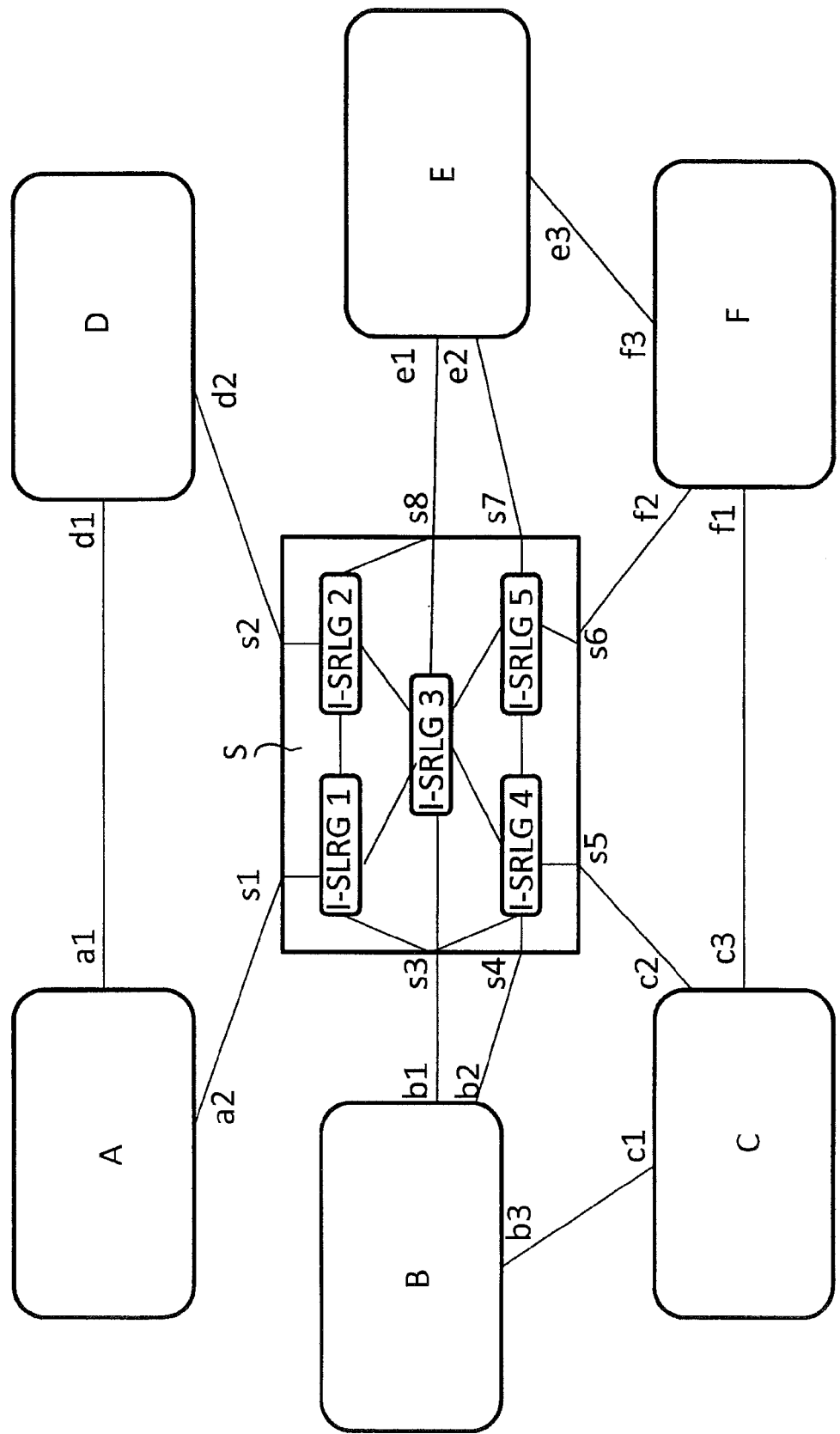

METHOD FOR TRAFFIC ENGINEERING ON NETWORKS MADE OF ASYMMETRICAL NETWORK SWITCHES

TECHNICAL BACKGROUND

The invention relates to a method for traffic engineering on networks made of asymmetrical network switches and to an asymmetrical network switch adapted to auto-discover and advertise into a traffic engineering, TE, domain a switch detailed connectivity matrix, SDCM.

Conventional packet switched networks such as IP/MPLS networks can be considered with a sufficient accuracy as made of non-blocking symmetrical switches. A non-blocking switch can be defined as one that can relay data incoming into the switch over one of its interfaces, i.e. an input interface, on to any other interface, i.e. output interface that belongs to the same layer network as the input interface. A blocking switch can be defined as one that can switch data from a given input interface on to a subset but not all same layer network output interfaces. From the point of view of a data flow traversing a switch towards the data destination, there are no disallowed input/output interface combinations in case of a non-blocking switch and there are such combinations in case of a blocking switch. In a network as depicted in FIG. 1 the shown switch S can be considered as a non-blocking switch if data incoming into the switch over one of its interfaces S1 to S8 can be switched on to any other of its interfaces.

A symmetrical switch can be defined as one that can switch data between a (unicast)pair/(multicast)set of interfaces with equal treatment, characteristics, quality of service and visible by the user effect on the data as between any other pair/set of interfaces. In other words, switching data by a symmetrical switch exhibits identical cost, data delay and lost characteristics, optical signal impairments, etc. regardless of which of its interfaces participate in the switching. On the contrary, switching on an asymmetrical switch causes different effects on the cost and quality of service of the data transfer depending on which pair of interfaces (in case of unicast) or a set of interfaces (in case of multicast) is selected for switching the data flow in question. For example, switch S shown in FIG. 1 can be considered as a symmetrical switch, if a data flow switched, for instance, over the switch interface pair S1, S2 experiences the exact same treatment as when switching over the interface pair S1, S5 or any other pair of interfaces of switch S.

The problem of routing on a network made of blocking switches was addressed in IETF CCAMP working group "General Network Element Constraint Encoding for GMPLS Controlled Networks" 83rd IETF Paris, France, March 2012. It was suggested to advertise a connectivity matrix for the purpose of path selection on the networks with at least one blocking switch. A connectivity matrix is advertised into a TE domain comprising at least one blocking switch by each of the blocking switches. The connectivity matrix provides information for the network path computer to select switchable combinations of input/output interfaces for every network switch that appears in the resulting paths.

Although the suggested solution is sufficient to address a blocking switch problem, it is not sufficient for handling asymmetrical switches.

The first reason is that there is a potential inaccuracy and sub-optimality of selected paths. For instance, if there are two pairs of switchable interface groups on a network switch, such as switch S, shown in FIG. 1, interfaces S3, S8 (group 1) and S4, S7 (group 2) and one of the groups, e.g. group 1 causes a data delay of x milliseconds, while the other group causes a data delay of y milliseconds (where x<y), because the delay values, x and y, of the data delay are not advertised, they are not available to a network path computer. Consequently, it is quite possible that the interface combination S4, S7 with the higher data delay is selected for the resulting path, while the interface pair S4, S7 having a lower data delay is not selected. Generally speaking, when a switching metric of a certain type, which for the same switch varies from one switching pair/set to another, is not advertised, the path computer with respect to the switch in question has to assume a worst case scenario which inevitably yields inaccurate and suboptimal results.

The second reason is the inability to compute equipment disjoint paths going through the same switch. Equipment disjoint paths are needed for the purpose of service protection against network failures. When two or more interfaces are cross-connected, this means that they are interconnected via an internal path that involves devices and appliances internal to the respective switch. The internal paths within the switch may use non-overlapping or overlapping sets of internal devices/appliances. To illustrate this, the exemplary switch S shown in FIG. 1 is depicted with internal devices labelled I-SRLG1 to I-SRLG5. For example, internal paths within the switch S supporting switching interface combinations S3⇔S8 and S4⇔S7 can use non-overlapping or overlapping sets of internal devices. Non-overlapping sets of internal devices for the interface switching combinations S3⇔S8 and S4⇔S7 are [I-SRLG1, I-SRLG3] and [I-SRLG4, I-SRLG5], respectively. Overlapping sets of internal devices are, for instance, [I-SRLG1, I-SRLG3] and [I-SRLG4, I-SRLG3, I-SRLG5], respectively. In the case of non-overlapping network internal devices, the paths are equipment disjoint, whereas in the case of overlapping sets of internal devices, the paths are not equipment disjoint. Because the information about the internal devices is not advertised into the TE domain, the network path computer does not have a visibility as to how the resulting paths will be provisioned internally on selected for the paths switches. Specifically, if two or more paths are selected to go through the same network switch, the path computer has no way of knowing whether the paths will use the same or different devices inside the respective network switch. For example, the network path computer does not know whether the internal device labelled as I-SRLG3 will or will not be used on switch S when two paths (one path using S3⇔S8 interface combination and the other path using S4⇔S7 interface combination) are provisioned. Consequently, the path computer does not know whether it is possible or not for a failure of one of these internal devices (e.g. I-SRLG3) to yield two or more of said paths simultaneously inoperable. Therefore, in order to guarantee path equipment diversity in conventional systems, path computers have to select switch-disjoint paths, i.e. paths that have no transit switches in common. This is suboptimal and insufficient, because switch-disjoint paths may not exist or be suboptimal to equipment disjoint paths converging on some switches. Furthermore, switch-disjoint paths selected for a given service share switches on the service source and destination, hence they do not protect against failures that may happen inside the service termination switches, while equipment disjoint paths protect services even in this case.

The third reason as to why the conventional solution is not sufficient for handling asymmetrical network switches resides in the inefficient routing of a service away from a failed network switch. If, for instance, a failure is detected on a switch internal device such as the entity identified as I-SRLG3 within the network switch S depicted in FIG. 1, the service of a conventional system can only be routed away from the entire network switch, but not within the switch away from the failed internal device. For example, if the S3 ⇔ S8 switching combination uses internal path supported by device identified as I-SRLG3, by selecting an alternative internal path (for instance, supported by devices identified as I-SRLG1, I-SRLG2) for the S3 ⇔ S8 switching combination, or by selecting an alternative switching pair, for example, S4⇔ S7 that uses the internal path supported by internal devices labelled as I-SRLG4, I-SRLG5, one could route the service away from the internal device I-SRLG3 in case it fails within the switch S. However, this is not possible in a conventional path computation environment because switch internal devices are not known in any form to the network path computers.

Accordingly, there is a need for a method and system which overcome the above-mentioned drawbacks and which allow also for the efficient handling of asymmetrical network switches.

SUMMARY OF THE INVENTION

According to the first aspect of the present invention, an asymmetrical network switch is provided adapted to auto-discover and advertise into a traffic engineering, TE, domain a switch detailed connectivity matrix, SDCM, containing for each allowed switching combination of interfaces of this asymmetrical network switch at least one switch detailed connectivity matrix entry, SDCME, wherein each said SDCME represents a potential connection internal to said asymmetrical network switch (point-to-point or point-to-multipoint) and interconnecting the interfaces of said interface switching combination, wherein a SDCME advertisement includes a switch detailed connectivity matrix entry cost vector, SDCME CV, which comprises a set of attributes describing cost penalties in terms of various service characteristics that a service incurs if it selects a path or a tree traversing the asymmetrical switch in accordance with the respective SDCME.

In a possible embodiment of the asymmetrical network switch according to the first aspect of the present invention, the switch detailed connectivity matrix entry, SDCME, advertisement further includes a switch scope unique connectivity matrix entry identifier, SDCME ID, as well as network scope unique identifiers of the interfaces that make up the associated interface switching combination.

In a still further possible embodiment of the asymmetrical network switch according to the first aspect of the present invention, the interface switching combination represents an internal point-to-point connection between an input interface and an output interface.

In a still further possible alternative embodiment, the interface switching combination represents a point-to-multipoint connection between an input interface and several output interfaces.

In a further possible embodiment of the asymmetrical network switch according to the first aspect of the present invention, the asymmetrical network switch includes an auto-discovery unit adapted to auto-discover cost attributes associated with respective internal potential connections.

In a still further possible embodiment of the asymmetrical network switch according to the first aspect of the present invention, the asymmetrical network switch is adapted to advertise for each allowed interface switching combination one or more corresponding switch detailed connectivity matrix entries, SDCMEs, for all or some of internal potential connections within the asymmetrical network switch interconnecting the interfaces of the respective interface switching combination.

In a further possible embodiment of the asymmetrical network switch according to the first aspect of the present invention, the cost attributes of a switch detailed connectivity matrix entry cost vector, SDCME CV, are associated with a particular internal to the switch potential connection and comprise (but not limited to)
a data propagation delay penalty,
a data loss ratio penalty,
a traffic engineering, TE, cost penalty,
an optical signal quality penalty,
a network failure fate-sharing penalty.

In a still further possible embodiment of the asymmetrical network switch according to the first aspect of the present invention, the asymmetrical network switch detailed connectivity matrix, SDCM, comprising one or more switch detailed connectivity matrix entries, SDCMEs, is advertised by said asymmetrical network switch into the traffic engineering, TE, domain and, thus, made available to a network path computer adapted to calculate optimal service paths or trees traversing said asymmetrical network switch, taking into account the cost penalties advertised by the asymmetrical network switch for one or more SDCMEs in the form of switch detailed connectivity matrix entry cost vectors, SDCME CVs.

In a still further possible embodiment of the asymmetrical network switch according to the first aspect of the present invention, the asymmetrical network switch detailed connectivity matrix, SDCM, is advertised by said asymmetrical network switch into the traffic engineering, TE, domain using a OSPF-TE protocol.

In a still further possible embodiment of the asymmetrical network switch according to the first aspect of the present invention, the asymmetrical switch detailed connectivity matrix, SDCM, is advertised by said asymmetrical network switch into the traffic engineering, TE, domain using a ISIS-TE routing protocol.

In a still further possible embodiment of the asymmetrical network switch according to the first aspect of the present invention, each switch detailed connectivity matrix entry, SDCME, of the switch detailed connection matrix, SDCM, representing a potential internal to said asymmetrical network switch connection comprises a switch scope unique 32-bit identifier, SDCME ID, as well as 32-bit or 64-bit network scope unique interface identifiers for each switch interface from the respective interface switching combination, which are advertised by said asymmetrical network switch along with its associated switch detailed connectivity matrix entry cost vector, SDCMECV.

In a further possible embodiment of the asymmetrical network switch according to the first aspect of the present invention, the asymmetrical network switch is a physical layer 1, layer 2 or layer 3 switch.

In a further possible embodiment of the asymmetrical network switch according to the first aspect of the present invention, the asymmetrical network switch is a virtual layer 1, layer 2 or layer 3 switch that represents a set of interconnected same layer network physical or virtual switches into a higher level traffic engineering, TE, domain as a single switch.

In a still further possible embodiment of the asymmetrical network switch according to the first aspect of the present invention, the switch detailed connectivity matrix, SDCM, is configurable.

According to a further second aspect of the present invention, a network comprising at least one asymmetrical network switch according to the first aspect is provided, wherein said network can be evaluated by at least one network path computer adapted to calculate an optimal service path or tree traversing at least one asymmetrical network switch honouring the switch detailed connectivity matrix entry cost vectors, SDCME CVs, advertised by the asymmetrical network switches within respective switch detailed connectivity matrices, SDCMs.

According to a possible embodiment of the network according to the second aspect of the present invention, the network comprises a packet switched network.

According to an alternative embodiment of the network according to the second aspect of the present invention, the network comprises a circuit switched network.

In a possible embodiment of the network according to the second aspect of the present invention, the circuit switched network is an optical transport layer network, such as WDM or OTN.

According to a further third aspect of the present invention, a method for traffic engineering on networks made of asymmetrical network switches is provided, wherein each asymmetrical network switch advertises into a traffic engineering, TE, domain a switch detailed connectivity matrix, SDCM, containing for each allowed switching combination of interfaces of said asymmetrical network switch at least one switch detailed connectivity matrix entry, SDCME, wherein each said SDCME represents an internal to the asymmetrical network switch potential connection interconnecting the interfaces of the associated interface switching combination,
wherein a SDCME advertisement includes a switch detailed connectivity matrix entry cost vector, SDCME CV, which comprises a set of attributes describing cost penalties in terms of various service characteristics that a service incurs if it selects a path or a tree traversing the asymmetrical switch in accordance with the respective SDCME.

According to a possible embodiment of the method according to the third aspect of the present invention, the advertised switch detailed connectivity matrices, SDCMs, are evaluated by a network path computer to calculate an optimal service path or tree traversing at least one asymmetrical network switch depending on the switch detailed connectivity matrix entry cost vectors, SDCME CVs, advertised by the asymmetrical network switches within respective SDCM advertisements.

According to a further possible embodiment of the method according to the third aspect of the present invention, the switch detailed connectivity matrix, SDCM, of an asymmetrical network switch is auto-discovered by the respective asymmetrical network switch In a further possible embodiment of the method according to the third aspect of the present invention, the switch detailed connectivity matrix, SDCM, of the asymmetrical network switch is configured via a management interface.

According to a further possible fourth aspect of the present invention, a path computer of a packet switched or circuit switched network is provided being adapted to calculate an optimal service path or tree traversing at least one asymmetrical network switch of said network by evaluating switch detailed connectivity matrix entry cost vectors, SDCME CVs, advertised by the asymmetrical network switches within respective SDCM advertisements.

BRIEF DESCRIPTION OF THE FIGURE

FIG. 1 shows an exemplary network comprising an asymmetrical network switch for illustrating different aspects of the present invention.

DETAILED DESCRIPTION OF EMBODIMENTS

FIG. 1 shows an exemplary network comprising at least one asymmetrical switch S. Other switches of the network are interconnected with the asymmetrical network switch S as illustrated in FIG. 1. In the shown example, the asymmetrical network switch S exposes several interfaces S1 to S8 to which external switches A, B, C, D, E, F of the network are connected to. The illustrated asymmetrical switch S is using internal devices or appliances. In the shown example, the switch S is using five internal devices identified by I-SRLG1 to I-SRLG5, wherein I-SRLG stands for Internal Shared Risk Link Group. The network shown in FIG. 1 can be a packet switched network or a circuit switched network. A circuit switched network can exist in an optical (WDM or OTN) or time division multiplexing, TDM, transport layer network. A circuit switched transport network, such as WDM layer network, can be built of blocking asymmetrical switches, such as WDM FOADMs and ROADMs. Internal devices within the switch S can comprise a variety of network devices and/or appliances, such as optical multiplexers, regenerators, wavelength converters, directionless switches, etc. The asymmetrical network switch S shown in FIG. 1 is adapted to auto-discover and advertise into traffic engineering, TE, domain a switch detailed connectivity matrix, SDCM. This SDCM advertisement contains for each allowed switching combination of interfaces of said asymmetrical network switch S at least one switch detailed connectivity matrix entry, SDCME. The SDCME is associated with and represents an internal to switch S potential connection interconnecting the interfaces of the interface switching combination.

An interface switching combination of a given switch, such as switch S, can comprise two or more interfaces. The interface switching combination represents a particular potential or real switch cross-connect that is used by a network service path or tree for the purpose of forwarding the service payload across the switch towards the service destination(s). The cross-connect can be unicast or multicast. The unicast cross-connect is supported by a point-to-point connection between an input interface and an output interface. The multicast cross-connect is supported by a point-to-multipoint connection between one input interface and several output interfaces.

The switch detailed connectivity matrix entry, SDCME, advertisement includes a switch detailed connectivity matrix entry cost vector, SDCM CV, which comprises a set of attributes describing cost penalties in terms of various service characteristics that a service incurs if it selects a path or a tree traversing the asymmetrical network switch S in accordance with the respective SDCME. The cost attributes of the SDCME CV are defined by the associated internal to the switch potential connection. The cost attributes can include, for instance, a data propagation delay penalty, a data loss ratio penalty, a traffic engineering, TE, cost penalty or a metric penalty, an optical signal quality penalty, a network failure fate-sharing penalty, etc. The optical signal quality penalty can, for instance, comprise optical impairment costs such as power level delta or OSNR delta. The SDCME CV comprises a set of costs that a given network service path or tree will incur should it include the respective interface combination in accordance with a given SDCME. The actual contents of the SDCME CV depends on path computation constraints supported by the domain path computers and can be defined by the respective domain policies.

In a possible embodiment, the SDCME CV is auto-discovered and pre-computed locally by each asymmetrical network switch for each or some of the allowed interface switching combinations and hence SDCMEs. Then, the switch detailed connectivity matrix, SDCM, is advertised by the asymmetrical network switches, for instance, as a separate sub-TLV, wherein TLV stands for Type Length Value which is a common and standardized way/frame for advertising TE information in an open and backward compatible manner. The SDCM sub-TLV contains a list of one or more SDCME (internal) sub-TLVs. Each SDCME sub-TLV includes in a possible embodiment:

a) a switch scope unique 32-bit SDCME ID,
b) a list of 32-bit (for numbered interfaces) and/or 64-bit (for unnumbered interfaces) network scope unique interface IDs, each of which identifying a corresponding switch network interface participating in the associated interface switching combination;
c) a switch detailed connectivity matrix cost vector, SDCM CV, internal sub-TLV.

SDCM sub-TLV may include more than one SDCME sub-TLVs for the same interface switching combination, each with a distinct SDCME CV sub-TLV.

In a possible implementation, the asymmetrical network switch S comprises an auto-discovery unit adapted to auto-discover cost attributes of internal potential connections. In a possible embodiment, the asymmetrical network switch S is adapted to advertise for each allowed interface switching combination the corresponding switch detailed connectivity matrix entries, SDCMEs, for all or some internal potential connections within the asymmetrical network switch interconnecting the interfaces of the respective interface switching combination. In a possible implementation, the asymmetrical network switch detailed connectivity matrix, SDCM, comprising one or more switch detailed connectivity matrix entry, SDCME, sub-TLVs is advertised by the asymmetrical network switch S into the traffic engineering, TE, domain and, thus, made available to a network path computer. This network path computer can be adapted to calculate optimal network service paths or trees traversing the asymmetrical network switch S, taking into account the cost vectors, SDCME CVs, advertised by the asymmetrical network switch S for one or more SDCMEs.

In a possible implementation, the asymmetrical network switch detailed connectivity matrix, SDCM, is advertised by the asymmetrical network switch S into the traffic engineering, TE, domain using an OSPF-TE protocol.

In a further possible embodiment, the asymmetrical network switch detailed connectivity matrix, SDCM, is advertised by the asymmetrical network switch S into the traffic engineering, TE, domain using an ISIS-TE routing protocol.

In a possible embodiment, the switch detailed connectivity matrix entry cost vector, SDCME CV, can include a network failure fate sharing cost comprising a list of 32-bit switch scope unique numbers, each of which identifying a switch internal device or appliance, such as a wavelength regenerator, which a switch internal connection interconnecting the interfaces of a given switching interface combination depends on. For instance, in the exemplary asymmetrical network switch S a switching interface pair such as S3⇔S8 comprises the interfaces S3 and S8 which are connected to each other via a switch internal connection that depends, for instance, on a regenerator identified by I-SRLG3. Link Shared Risk Link Groups, SRLGs is a widely accepted way of advertising link network failure fate-sharing information. According to a possible embodiment, the Internal Shared Risk Link Groups, I-SRLGs, is a way of exposing network failure fate-sharing information of internal connections supporting various interface switching combinations to the network path computer. The I-SRLGs cost can be advertised within the SDCME CV sub-TLVs along with other SDCME CV costs, such as data switching delay or optical impairments cost penalties. For example, a SDCME sub-TLV for the SDCME associated with the interface switching combinations S4⇔S7 that depends on an internal connection supported by internal devices identified by I-SRLG4, I-SRLG5 may include network failure fate-sharing cost advertised within respective SDCME CV sub-TLV as a list of two switch scope unique 32-bit numbers: I-SRLG4 and I-SRLG5.

The method according to the present invention allows for an asymmetrical network switch to advertise more than one switch detailed connectivity matrix entries, SDCMEs, for the same pair or set of interfaces, each with a distinct SDCME CV sub-TLV. For example, a WDM ROADM can advertise two SDCMEs for the S3⇔S8 switching interface combination, because in the exemplary network switch shown in FIG. 1 there can be two internal potential paths interconnecting these interfaces S3 and S8, i.e. the first path depending on switch internal device identified as I-SRLG3, and the second path depending on the internal devices identified as I-SRLG1 and I-SRLG2. For example, it may be possible that the first path yields a better optical impairment characteristic than the second path, because the internal device identified as I-SRLG3 is an optical regenerator, but has a higher overall cost compared to the second path. Depending on the path optimization criteria or constraints set for a given network service, a network path computer can select either of the two paths and hence associated with the paths SDCMEs. This selection is to be conveyed, i.e. signalled, to the respective asymmetrical network switch S, so that the switch S will know which of the SDCMEs was selected by the path computer. As a result, switch S will be informed (via SDCME ID) which of the two internal paths are to be used to form a cross-connect between the switch interfaces S3 and S8. Current semantics of the GMPLS RSVP-signalling protocol for the connection (LSP) path specification (RSVP-TE Explicit Route Object (ERO)) is not sufficient. According to a possible embodiment, the ERO semantics are extended by introducing a switch detailed connectivity matrix entry ID (SDCME ID) ERO sub-object, and allowing for the SDCME ID sub-object to appear in the ERO object of the RSVP-TE Path message. The purpose of such signalling is to indicate to the RSVP-TE Path message processing node which of the SDCMEs was selected for provisioning the cross-connect between the interfaces identified by the local to the node numbered or unnumbered interface ERO sub-object found in the ERO immediately before the SCME ID sub-object.

In a possible embodiment of the asymmetrical network switch illustrated in FIG. 1, the switch S is formed by a layer 1 switch (e.g. WDM ROADM). In an alternative embodiment, the asymmetrical network switch S as shown in FIG. 1 can be formed by a layer 2 switch (e.g. Ethernet switch). In a still further possible embodiment, the asymmetrical network switch S as shown in FIG. 1 can be formed by a layer 3 switch (e.g. IP router).

In a further possible embodiment of the asymmetrical network switch, the asymmetrical network switch S as shown in FIG. 1 can also be an asymmetrical layer 1, 2 or 3 virtual network switch. This virtual network switch can represent a group of interconnected same layer network physical and/or virtual switches as a single asymmetrical switch in a higher level traffic engineering, TE, domain.

In a possible embodiment, the asymmetrical network switch further comprises an internal auto-discovery unit adapted to auto-discover cost attributes of internal potential connections for each of the allowed interface switching combination. In an alternative embodiment, the switch detailed connectivity matrix, SDCM, can also be configured via a configuration management interface of the network switch S.

The network illustrated in FIG. 1, generally speaking, is made of a plurality of distinct asymmetrical network switches. The network can be evaluated by at least one network path computer. This path computer is adapted to calculate an optimal network service path or tree traversing at least one asymmetrical network switch honouring the switch detailed connectivity matrix entry cost vectors, SDCME CVs, advertised by the asymmetrical network switches within respective switch detailed connectivity matrices, SDCMs. The advertised SDCMs are available to the network path computer and are considered while selecting an optimal network service path or tree traversing at least one asymmetrical network switch. The path/tree computation depends on the switch detailed connectivity matrix entry cost vectors. SDCME CVs, advertised by each asymmetrical network switch. The path computer can be used in a circuit switched network or in a packet switched network. The network can comprise one or several path computers. The path computers are capable of dealing with asymmetrical network switches that advertise switch detailed connectivity matrices, SDCMs. They generate resulting paths containing selected switch detailed connectivity matrix entry IDs, SDCME IDs. The selected SDCME IDs may be included into a provisioning/signalling message sent at the time of network service path/tree provisioning to the switches along the selected path/tree to remove any ambiguity with respect to which of the SDCMEs is to be used in case a given switch advertises more than one such SDCMRs for the same interface switching combination, each with a distinct cost vector, SDCME CV.

The method and apparatus according to the present invention overcomes the drawbacks of a conventional system.

The switch detailed connectivity matrix entry cost vector, SDCME CV, sub-TLV provides for the network path computer the attributes of interface switching combinations on per interface switching combination basis (the same way as TE Link TLV makes path computer aware of network TE link attributes on per TE link basis). Therefore, the path computer has all the necessary information to take advantage of switch asymmetricities and select most optimal paths (e.g. paths with minimal end-to-end delay or maximal accumulated/acceptable OSNR margin at path termination/regeneration points). For example, path computation with optimization on minimal end-to-end delay criteria can select a path (e.g. [B:b1-s3⇔s8-e1:E]) taking into consideration data delay characteristics advertised for network links (e.g. b1-s3, s8-e1) and interface switching combinations (such as s3⇔s8).

The network failure fate sharing cost penalty (in terms of I-SRLGs) of the suggested switch detailed connectivity matrix entry cost vector, SDCME CV, makes possible for the path computer to select equipment disjoint paths going through the same switches by finding paths that do not have I-SRLGs in common on any of the switches that appear in the resulting paths/trees. For example, paths [B:b1-s3⇔s8-e1:E] and [B:b2-s4⇔s7-e2:E] will be equipment disjoint if s3⇔s8 SDCME advertises network failure fate sharing cost (I-SRLG3), while s4⇔s7 SDCME-(I-SRLG4, I-SRLG5).

When a switch internal device, such as wavelength splitter or convertor, fails, it is possible for the switch S to signal the fact of the failure to the entities responsible for affected by the failure network services recovery (e.g. to the services respective ingress switches), specifying the I-SRLG associated with the failed device. This makes it possible for the service recovery path computation engine to route affected network services away from the failure by selecting alternative paths/trees that do not depend on the signalled I-SRLG. For example, if an internal device identified by I-SRLG3 fails, a network service using path [B:b1-s3⇔s8-e1:E] can be rerouted on to the path [B:b2-s4⇔s7-e2:E] with s4⇔s7 interface switching pair using the switch internal connection going through the devices identified by I-SRLG4 and I-SRLG5, respectively.

An extension to the semantics of the GMPLS RSVP-TE ERO (SDCME ID ERO sub-object) disambiguates the connection provisioning on switches that have multiple (more than one) ways to cross-connect the same pair/set of interfaces (each relying on a different switch internal path).

The invention claimed is:

1. An asymmetrical network switch, comprising:
   a processor; and
   a non-transitory computer readable medium, including:
   instructions executable by the processor to auto-discover and advertise into a traffic engineering, TE, domain a switch detailed connectivity matrix, SDCM, containing for each allowed switching combination of interfaces of said asymmetrical network switch at least one switch detailed connectivity matrix entry, SDCME,
   each SDCME representing a potential connection internal to said asymmetrical network switch and interconnecting the interfaces of said interface switching combination,
   an SDCME advertisement by said switch including a switch detailed connectivity matrix entry cost vector, SDCME CV, comprising a set of attributes describing cost penalties as various service characteristics that a network service incurs if said network service selects a path or a tree traversing the asymmetrical switch in accordance with the SDCME, and
   an auto-discovery unit adapted to auto-discover cost attributes of the said potential connection internal(s) to said asymmetrical network switch, wherein the cost attributes include at least one of a data propagation delay penalty, a data loss ratio penalty, a traffic engineering, TE, cost penalty, or an optical signal quality penalty.

2. The asymmetrical network switch according to claim 1, wherein the switch detailed connectivity matrix entry, SDCME, advertisement further includes a switch scope unique connectivity matrix entry ID, SDCME ID, and network scope unique IDs of the interfaces that make up the associated interface switching combination.

3. The asymmetrical network switch according to claim 2, wherein the interface switching combination is associated with a point-to-point connection between an input interface and an output interface or a point-to-multipoint connection between an input interface and several output interfaces.

4. The asymmetrical network switch according to claim 1, wherein the asymmetrical network switch is adapted to advertise for each allowed interface switching combination one or more switch detailed connectivity matrix entries, SDCMEs, for internal potential connections within the asymmetrical network switch interconnecting the interfaces of the respective interface switching combination.

5. The asymmetrical network switch according to claim 1, wherein the cost attributes of a switch detailed connectivity matrix entry cost vector, SDCME CV, are associated with a particular internal to the switch potential connection and comprises one or more of the following cost vector penalties: a data propagation delay penalty, a data loss ratio penalty, a TE cost penalty, an optical signal quality penalty, a network failure fate-sharing penalty.

6. The asymmetrical network switch according to claim 1, wherein an asymmetrical network switch detailed connectivity matrix, SDCM, comprising one or more switch detailed connectivity matrix entries, SDCMEs, is advertised by said asymmetrical network switch into the traffic engineering, TE, domain and, thus, made available to a network path computer adapted to calculate enhanced network service paths or trees traversing said network switch, taking into account the cost vectors, SDCME CVs, advertised by the asymmetrical network switch for one or more switch detailed connectivity matrix entries, SDCMEs.

7. The asymmetrical network switch according to claim 6, wherein the asymmetrical network switch detailed connectivity matrix, SDCM, is advertised by said asymmetrical network switch into the traffic engineering, TE, domain using Open Shortest Path First-Traffic Engineering (OSPF-TE), or Intermediate System to Intermediate System (ISIS-TE) routing protocols.

8. The asymmetrical network switch according to claim 1, wherein each switch detailed connectivity matrix entry, SDCME, of the switch detailed connectivity matrix, SDCM, represents a potential internal to said asymmetrical network switch connection, is identified by a switch scope unique identifier, SDCME ID, which is advertised by said asymmetrical network switch as a part of SDCME along with network scope unique IDs of interfaces making up the associated interface switching combination and its associated switch detailed connectivity matrix entry cost vector, SDCME CV.

9. The asymmetrical network switch according to claim 1, wherein the asymmetrical network switch is a physical layer 1, 2 or 3 switch.

10. The asymmetrical network switch according to claim 1, wherein the asymmetrical network switch is a virtual layer 1, 2 or 3 switch, representing a group of interconnected same layer network physical and/or virtual switches as a single switch in a higher level traffic engineering, TE, domain.

11. The asymmetrical network switch according to claim 1, wherein the switch detailed connectivity matrix, SDCM, is configurable.

12. A network, comprising:
  at least one asymmetrical network switch adapted to auto-discover and advertise into a traffic engineering, TE, domain a switch detailed connectivity matrix, SDCM, containing for each allowed switching combination of interfaces of said asymmetrical network switch at least one switch detailed connectivity matrix entry, SDCME,
  each SDCME representing a potential connection internal to said asymmetrical network switch and interconnecting the interfaces of said interface switching combination, and
  an SDCME advertisement by said switch including a switch detailed connectivity matrix entry cost vector, SDCME CV, comprising a set of attributes describing cost penalties in terms of various service characteristics that a network service incurs if said network service selects a path or a tree traversing the asymmetrical switch in accordance with the SDCME, the switch further comprising an auto-discovery unit adapted to auto-discover cost attributes of said potential connection(s) internal to said asymmetrical network switch, wherein the cost attributes include at least one of a data propagation delay penalty, a data loss ratio penalty, a traffic engineering, TE, cost penalty, or an optical signal quality penalty; and
  at least one network path computer adapted to calculate an enhanced network service path or tree traversing at least one asymmetrical network switch honoring the switch detailed connectivity matrix entry cost vectors, SDCME CVs, advertised by the asymmetrical network switches within respective switch detailed connectivity matrices, SDCMs.

13. The network according to claim 12, wherein the network comprises a packet switched network or a circuit switched network.

14. The network according to claim 13, wherein the circuit switched network is an optical WDM or OTN transport layer network.

15. A method for traffic engineering on networks made of asymmetrical network switches, comprising:
  auto-discovering and advertising by at least one of the asymmetrical network switches into a traffic engineering, TE, domain a switch detailed connectivity matrix, SDCM, containing for each allowed switching combination of interfaces of said asymmetrical network switch at least one switch detailed connectivity matrix entry, SDCME, and a corresponding switch detailed connectivity matrix entry cost vector, SDCME CV;
  providing by at least one of the switches each said SDCME each representing a potential connection internal to said asymmetrical network switch potential interconnecting the interfaces of said interface switching combination;
  providing by at least one of the switches corresponding each said corresponding SDCME CV, each SDCME CV comprising a set of attributes describing cost penalties in terms of various service characteristics that a network service incurs if said network service selects a path or a tree traversing the asymmetrical switch in accordance with the respective SDCME; and
  wherein the auto-discovering step comprises auto-discovering cost attributes of said potential connection internal to said asymmetrical network switch, wherein the cost attributes include at least one of a data propagation delay penalty, a data loss ratio penalty, a traffic engineering, TE, cost penalty, or an optical signal quality penalty.

16. The method according to claim 15, wherein the advertised switch detailed connectivity matrices, SDCMs, are evaluated by a network path computer to calculate an enhanced network service path or tree traversing at least one asymmetrical network switch, taking into account the switch detailed connectivity matrix entry cost vectors, SDCME CVs, advertised by the asymmetrical network switches.

17. The method according to claim 15, wherein the switch detailed connectivity matrix, SDCM, of an asymmetrical network switch is adjustable via a management interface.

* * * * *